May 19, 1953 F. ELIAS 2,639,091
RADIOGRAPH CALCULATOR
Filed April 10, 1951 2 Sheets-Sheet 1

INVENTOR.
Frederick Elias
BY
ATTORNEY

May 19, 1953        F. ELIAS        2,639,091

RADIOGRAPH CALCULATOR

Filed April 10, 1951        2 Sheets-Sheet 2

INVENTOR.
Frederick Elias
BY
ATTORNEY

Patented May 19, 1953

2,639,091

UNITED STATES PATENT OFFICE 2,639,091

RADIOGRAPH CALCULATOR

Frederick Elias, Woodbourne, N. Y.

Application April 10, 1951, Serial No. 220,150

3 Claims. (Cl. 235—61)

This invention relates to rotary calculators and has for its object the provision of a rotary calculator adapted for use as a radiograph calculator.

Another object is to provide a radiograph calculator wherein all of the essential information and data required by the operator of an X-ray or radiograph machine for taking a proper radiograph of any part of the body is quickly and easily ascertainable.

A further object is to simplify and make quickly available by means of a rotary calculator, the plurality of data and information required in the taking of radiographs by the operator of an X-ray or radiograph machine.

Other objects will be apparent as the invention is more fully hereinafter disclosed.

In accordance with these objects I have devised a rotary calculator in which by the rotation of a single disc about its axis over an underlying chart or pre-arranged set of indicia markings to any one of a plurality of selected rotated positions, the desired data or information for operating a radiograph machine appears automatically at provided openings through the disc.

In the taking of X-ray pictures of the various parts of the body, the X-ray machine operator has the problem of properly adjusting the machine to obtain the best and clearest picture obtainable. This problem involves the correct adjustment of the machine as to current, time, voltage, distance and technique. The choice of adjustments in the radiographing of any given part of the body is largely empirical and each operator after years of experience generally develops a system of his own which may be good or bad from the viewpoint of the diagnostician who is called upon to read or interpret the picture.

In general, I have found that of the five variables above noted four of them can be chosen by rule and can therefore be arranged for automatic viewing through prescribed windows in the rotating disc of the present invention. The fifth variable, voltage, however varies with the thickness of the part in the direction of X-ray projection and it is necessary for the operator to know precisely what voltage to use with each thickness of the part to be X-rayed. In radiographing the human body there are thirty-six different body parts usually radiographed and about twenty different thickness/voltage relationships of these parts to indicate visually. The calculator device herein shown is designed to provide the data for these parts that are usually radiographed.

In the present invention I have provided for the automatic ascertaining of the proper thickness/voltage relationship for any one of these selected body parts by providing an arcuate window in the axially rotatable disc which is scaled as to thickness and by providing on the face of the chart a series of arcuate voltage indicia markings arranged concentric with the rotating path of the arcuate window in a position to be viewed through the window at each rotated position of the disc and means consisting of an adjustable pointer pivotally mounted at the axial center of the arcuate window to select the voltage on the scale corresponding to the precise thickness of the body part to be radiographed.

The selection of the body part on which the correct data on the five variables is desired by the operator is most conveniently accomplished by visually indicating the various body parts on the outer edge of the underlying chart, preferably on an annular area of the chart extending beyond the peripheral edge of the rotating disc and by providing an indexing pointer on the face of the disc directing the rotation of the disc to the selected visually indicated body part. The indicia markings on the face of the chart underlying the rotatable disc for viewing through each of the windows provided in the disc are disposed in proper spaced position along the circular path of travel of each window.

As one specific example of the radiograph calculator of the present invention but not as a limitation thereof, one specific embodiment of the same is illustrated in the accompanying drawings, wherein.

Figure 1:
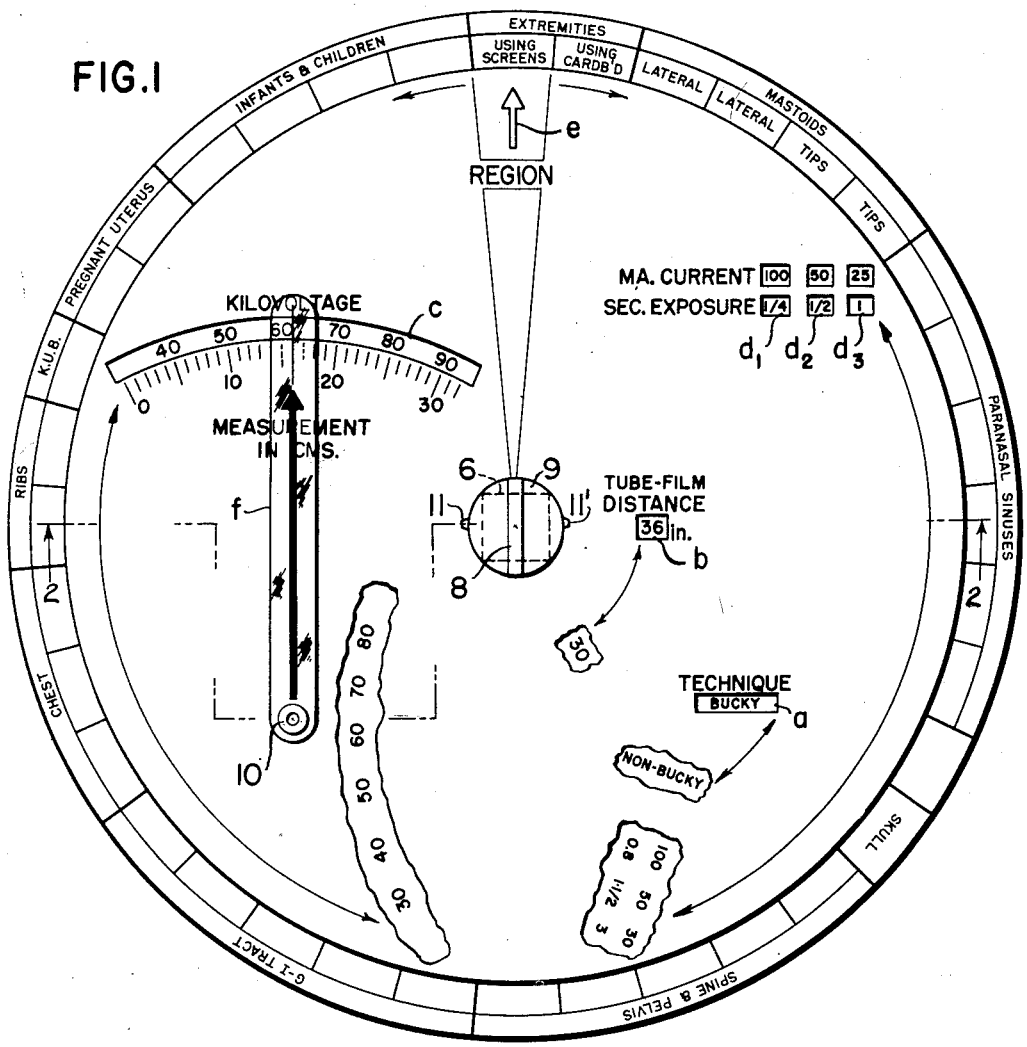
Fig. 1 is a top view of the radiograph calculator of the invention.
Figure 2:
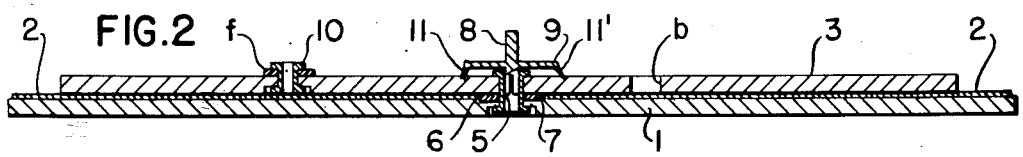
Fig. 2 is a sectional view of same taken along plane 2—2 of Fig. 1.
Figure 3:
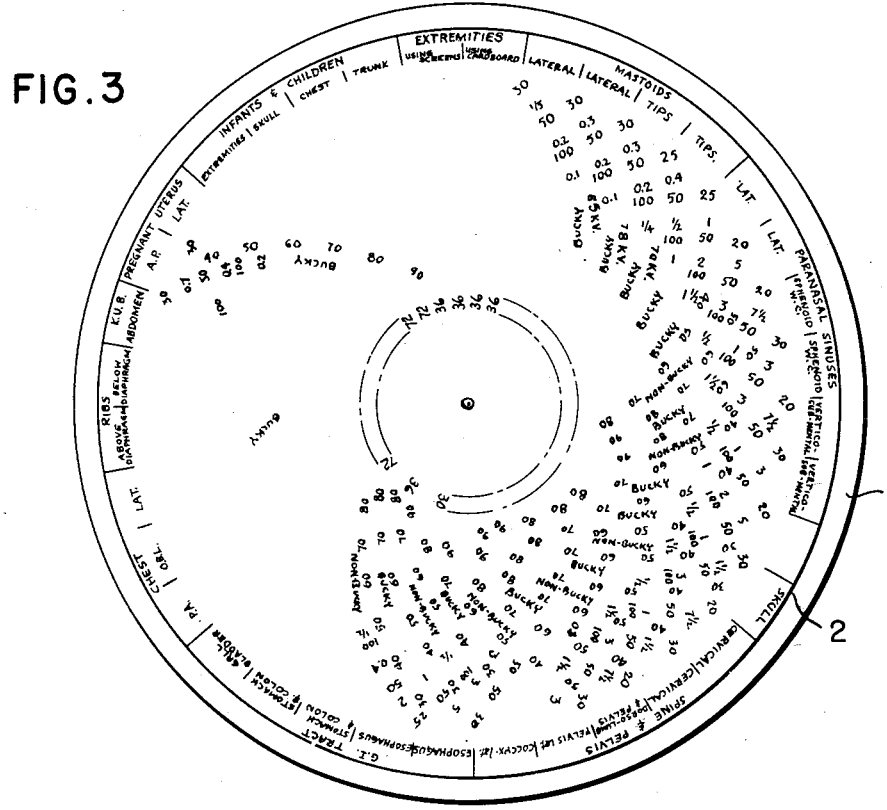
Fig. 3 is a top view illustrating one element of the present invention.
Figure 4:
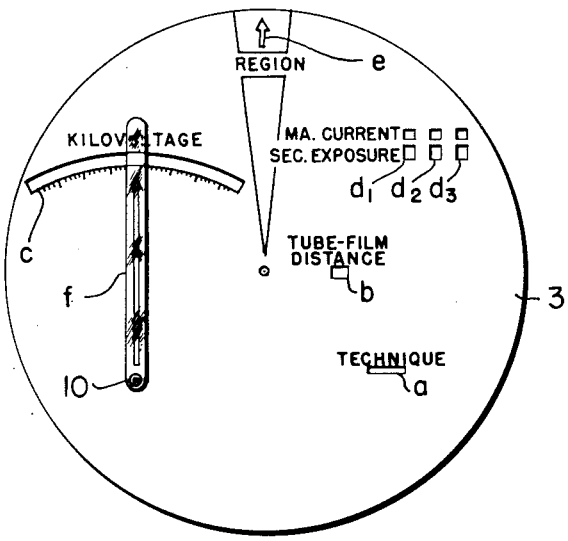
Fig. 4 is a top view illustrating another element of the present invention.

Referring to the drawings, the calculator device shown consists of a disc base member 1 which may consist of metal, wood, molded synthetic resin or any other suitable material without departure from the invention on which base 1 is mounted, preferably removably mounted, a chart 2, over which is rotatively mounted selector disc 3.

Selector disc 3 is provided with a plurality of windows $a$, $b$, $c$, and $d_1$, $d_2$, $d_3$, each located at a different distance from the center axis of the disc 3 and in different segments of the disc so as to prescribe separate annular paths of travel over the face of the underlying chart 2. On the upper face of disc 3 is inscribed an indexing means such as arrow e for rotatively locating the disc with relation to the visually indicated body parts on the chart. Pointer means f is also pivotally mounted on the rotating disc 3 at the axial center 10 of arcuate window c and along the arcuate edge of window c is inscribed scale markings in centimeters representing thickness of the part to be radiographed.

Disc 3 may consist of metal, wood, molded synthetic resin or any other suitable material without departure from the invention and the particular way in which the disc 3 is mounted for rotative movement on base 1 may be widely varied without departure from the invention. I prefer to mount disc 3 for rotative movement in a manner which permits ready mounting and demounting. I also prefer to detachably locate the chart 2 on the base 1 so that the chart may be readily replaced by a new chart, if desired.

In accordance with these preferences I have provided at the axial center of base 1 an upstanding hollow pivot member 5 which is fixedly secured to the base 1. Square washer 6 seated partially in square recess 7 in base 1 provides a means for non-rotatively locating chart 2 on the face of the base 1 and provides a bearing surface for disc 3 to rotate upon. Disc 3 is secured for rotation on member 5 by turn-key 8 having an expanding pin extension 9 seating within and frictionally engaging the inner surface of hollow pivot member 5 with the pin extensions 11—11' on the under surface of the turn-key 8 seating in corresponding recesses in the upper faces of disc 3.

In the operation of the calculator device of the present invention it is believed self-evident that as the disc 3 is rotated about its axis in either direction to locate the indicator arrow e in radial alignment with any given enumerated body section inscribed on the exposed peripheral area of chart 2, each of the windows a, b, c and $d_1$, $d_2$ and $d_3$, prescribe a circular path over the underlying chart 2. The circular path for each window is indicated by dotted line double pointed arrows. The face of the chart 2 for each position of the indicator arrow e is provided with printed data in proper position to align with each window giving the required data for the four variables of current, time, distance and technique (Bucky or non-Bucky) at the windows a, b, and $d_1$, $d_2$ and $d_3$. The variable of the thickness/voltage ratio then may be determined at window c by moving the pointer f to the position on the scale indicated showing the precise thickness of the part to be X-rayed and determining from the exposed kilo-volt scale the voltage to be used on the X-ray tube.

At windows $d_1$, $d_2$ and $d_3$ the operator determines the precise time interval of exposure for each section of the part to be X-rayed based on the current to be used on the X-ray tube expressed in terms of milliamperes (m.a.). The time of exposure may vary within rather wide limits but under any given set of selected conditions for the other variables there are practical limits within which the time of exposure should be held. These limits are shown at windows $d_1$, $d_2$ and $d_3$.

It is believed apparent that the present invention affords a simple and effective calculator means for the operator of a radiograph apparatus to determine the best settings for the five known variables in the radiographing of selected parts of the body based on the best empirical knowledge to date. The ready determination of these variables of current, time, distance, technique and voltage facilitates the taking of radiographs and standardizes the radiograph result so that the reading of the radiograph by those skilled in the art is facilitated.

It is apparent that many modifications and departures from the invention may be made by those skilled in the art without essential departure from the invention or from the specific embodiment thereof shown in the drawings, and all such modifications and departures are contemplated as may fall within the scope of the following claims:

What I claim is:

1. A radiograph calculator device comprising a flat surfaced base member, a disc selector member, and means sustaining the selector member for axial rotation over the flat surface of the base member, a plurality of window openings in the selector member each in a different segment of the selector member and at a different distance from the center of the selector member, one of said windows being arcuate and extending generally radially in its segment, a pointer means pivotally sustained on the selector member at the axial center of the arcuate window and having a length greater than the radius of the arcuate window, and a chart non-rotatively sustained in the space gap between the base member and the selector member, said chart having indicia markings thereon aligned annularly to be visible through the said windows at each segmental position of rotation of the said selector member and indicia markings identifying the segmental positions of rotation, and an indexing means for selectively rotating the selector member to a desired segmental position.

2. The combination of claim 1, wherein one window and underlying indicia markings on the chart face is provided to show current, another to show time, a third to show distance, a fourth to show technique, and the arcuate window and underlying indicia markings shows a voltage range, and wherein the position of the pointer over the said voltage range is adjustable over a thickness range scale to indicate the voltage/thickness relationship variable.

3. In a radiograph calculator device, a chart having an anular series of indicia markings thereon defining segments of a circle with each segment defining a specific part of the human body to be radiographed and a selector disc mounted to be rotatable about the center axis of the chart, said selector disc having a diameter less than the diameter of the chart and having an indexing means for rotating the disc to any desired segmental position of rotation over the chart, and having a plurality of windows in the selector member, each said window being disposed in a different segment and at a different distance from the center of the member with one of said windows being arcuate and extending radially its sector, a pointer means pivotally mounted at the arcuate center of the said arcuate window and having a length greater than the radius of the arc, the face of said chart underlying the said selector member being provided with indicia markings aligning with each window at each segmental setting of the selector window over the chart giving for each part to be radiographed the specific adjustments to be made in a radiograph machine as to current, time, distance, technique, and the voltage to use at the thickness of the part being radiographed.

FREDERICK ELIAS.

References Cited in the file of this patent

UNITED STATES PATENTS

| Number | Name | Date |
|---|---|---|
| 331,264 | Tucker | Nov. 24, 1885 |
| 784,660 | Chritton | Mar. 14, 1905 |
| 896,002 | Free | Aug. 11, 1908 |
| 1,426,829 | Flynn | Aug. 22, 1922 |
| 1,435,512 | Boggio | Nov. 14, 1922 |
| 2,455,522 | Ringler | Dec. 7, 1948 |
| 2,484,366 | Wilson | Oct. 11, 1949 |

FOREIGN PATENTS

| Number | Country | Date |
|---|---|---|
| 340,206 | Great Britain | Oct. 1, 1925 |
| 382,589 | Great Britain | Oct. 27, 1932 |

OTHER REFERENCES

"X-Rays," pp. 49 and 6; published in 1925 by the Eastman Kodak Co., Medical Div., Rochester, N. Y.

"X-Rays in Practice," by Wayne T. Sproul, paragraph 2, p. 213; published by McGraw-Hill Co. of New York in 1946.

"Applied X-Rays," by G. L. Clark, 3rd Edition, page 156; published in 1940 by the McGraw-Hill Book Co., Inc. in New York.